United States Patent
Mazur et al.

(10) Patent No.: US 12,085,920 B1
(45) Date of Patent: Sep. 10, 2024

(54) ADAPTIVE CONTAINER DEPLOYMENT TO HIERARCHICAL LEVELS ASSOCIATED WITH AN AUTOMATION CONTROL SYSTEM

(71) Applicant: Rockwell Automation Technologies, Inc., Mayfield Heights, OH (US)

(72) Inventors: David C. Mazur, Mequon, WI (US); Rob A Entzminger, Shawnee, KS (US); Patrick E. Ozimek, Mequon, WI (US); Jonathan Alan Mills, Mayfield Heights, OH (US); Michael J. Anthony, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/219,961

(22) Filed: Jul. 10, 2023

(51) Int. Cl.
G05B 19/418 (2006.01)
G06F 9/455 (2018.01)
G06F 9/48 (2006.01)

(52) U.S. Cl.
CPC ... *G05B 19/41835* (2013.01); *G06F 9/45558* (2013.01); *G06F 9/485* (2013.01); *G05B 2219/31368* (2013.01); *G06F 2009/45575* (2013.01)

(58) Field of Classification Search
None
See application file for complete search history.

(56) References Cited

U.S. PATENT DOCUMENTS 10,715,388 B2    7/2020    Fildebrandt et al.
11,182,206 B2    11/2021    Jung et al.
11,474,873 B2    10/2022    Biernat et al.
11,513,877 B2    11/2022    Biernat et al.
2015/0316909 A1*    11/2015    Govindaraj .......... G05B 19/048 700/19
2018/0024537 A1    1/2018    Chauvet et al.

(Continued)

FOREIGN PATENT DOCUMENTS

KR    20200027783 A    3/2020
WO    2020184362 A1    9/2020

OTHER PUBLICATIONS

Extended European Search Report for European Patent Application No. 21179775.8, dated Nov. 25, 2021, 9 pages.

(Continued)

*Primary Examiner* — Lewis A Bullock, Jr.
*Assistant Examiner* — Melissa A Headly
(74) *Attorney, Agent, or Firm* — Fletcher Yoder, P.C.

(57) ABSTRACT

Systems and methods described herein may relate to a system that includes one or more industrial devices that perform one or more operations within an industrial automation system. One or more industrial devices may include a compute surface able to perform one or more software tasks. The system may include a processor that determines a trigger event has occurred. The processor may determine additional data and a target device based on the trigger event, where the processor may be located on a different hierarchical level as compared to the target device. The processor may determine a container to be deployed to the target device based on the container generating the additional data when deployed on the target device. The processor may deploy the container to the target device.

17 Claims, 7 Drawing Sheets

(56) References Cited

U.S. PATENT DOCUMENTS

| | | | |
|---|---|---|---|
| 2018/0054469 A1 | 2/2018 | Simoncelli | |
| 2019/0377604 A1 | 12/2019 | Cybulski | |
| 2020/0136906 A1 | 4/2020 | Bernat et al. | |
| 2020/0249928 A1 | 8/2020 | Zeng et al. | |
| 2020/0278892 A1 | 9/2020 | Nainar et al. | |
| 2020/0311617 A1 | 10/2020 | Swan et al. | |
| 2021/0089354 A1 | 3/2021 | Nixon et al. | |
| 2021/0200814 A1 | 7/2021 | Tal et al. | |
| 2021/0218617 A1 | 7/2021 | Palavalli et al. | |
| 2021/0294632 A1* | 9/2021 | Kondo | G06F 9/4856 |
| 2021/0382727 A1 | 12/2021 | Vigil et al. | |
| 2022/0027721 A1 | 1/2022 | Thoemmes et al. | |
| 2022/0091572 A1 | 3/2022 | Biernat et al. | |
| 2022/0091583 A1* | 3/2022 | Biernat | G06F 9/45558 |
| 2022/0391259 A1 | 12/2022 | Biernat et al. | |
| 2023/0188433 A1* | 6/2023 | Sundararaman | H04L 41/5022 709/226 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface, retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Liu, Y. et al., "A Data-Centric Internet of Things Framework Based on Azure Cloud," IEEE Access, vol. 7, Mar. 27, 2019, 20 pages.

\* cited by examiner

ADAPTIVE CONTAINER DEPLOYMENT TO HIERARCHICAL LEVELS ASSOCIATED WITH AN AUTOMATION CONTROL SYSTEM

BACKGROUND

The present disclosure generally relates to systems and methods to implement a container orchestration system in an operational technology (OT) network that includes one or more industrial automation systems. More particularly, embodiments of the present disclosure are related to systems and methods for leveraging container orchestration systems to collect and analyze data from OT devices.

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, industrial control systems that operate in the OT environment are used to control industrial devices accessible via an OT network. However, for tasks that occur at high speed and/or high frequency, communication latencies may make it challenging for the industrial control system to efficiently control of the industrial devices. For example, collecting data from data sources and communicating the collected data long distances within the OT network for processing and/or analysis introduce communication latency or time delays. Accordingly, improved systems and methods for collecting and analyzing data within an OT network are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include multiple industrial devices that may perform one or more operations within an industrial automation system. Each device of the industrial devices may include a compute surface able to perform one or more software tasks. The system may include a processor that determines a trigger event has occurred. The processor may determine additional data and a target device based on the trigger event, where the processor may be located on a different hierarchical level as compared to the target device. The processor may determine a container to be deployed to the target device based on the container generating the additional data when deployed on the target device. The processor may deploy the container to the target device.

In another embodiment, a non-transitory, computer-readable medium may store instructions that, when executed by a processor, cause the processor to perform operations. The operations may include receiving an alert associated with one or more operations and identifying a subset of devices related to the alert. The devices may be associated with multiple hierarchical locations. The operations may include identifying a subset of the multiple hierarchical locations as being associated with the subset of devices. The operations may include sending a set of containers to a first device of the subset of devices based on the subset of the multiple hierarchical locations and the alert. The set of containers, when operating on the first device, may transmit data to the processor. The first device may be located on a different hierarchical level as compared to the processor.

In a further embodiment, a non-transitory, computer-readable medium may store instructions that, when executed by a processor, cause the processor to perform operations. The operations may include receiving an indication that a trigger event has occurred, where the trigger event may correspond to a first device associated with a first hierarchical level of an industrial automation system. The operations may include determining additional data and a target device based on the trigger event, where the target device may be located on a different hierarchical level as compared to the first device. The operations may include determining a container to be deployed to the target device based on the container being able to generate the additional data when deployed on the target device. The operations may include deploying the container to the target device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
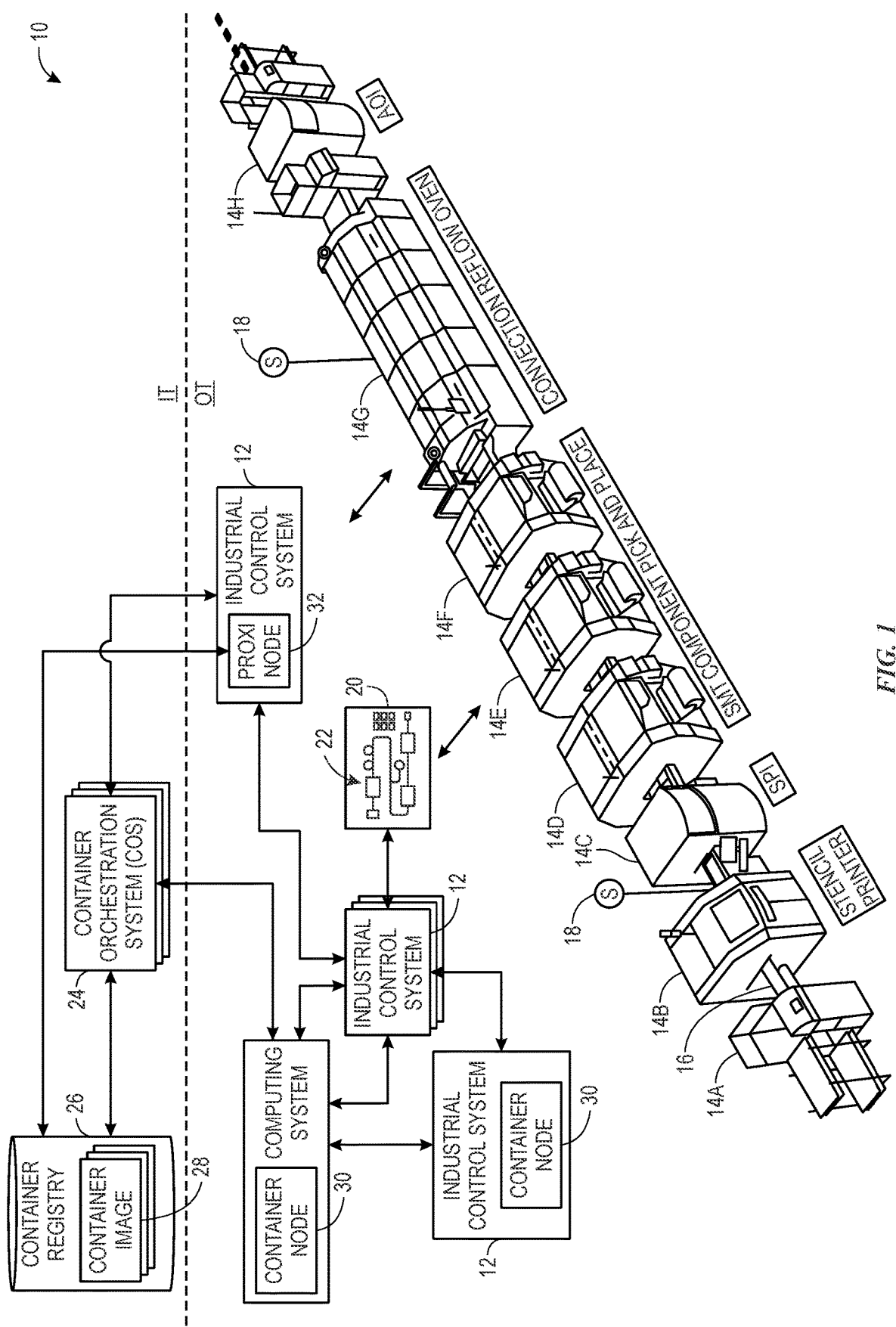
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed toward industrial automation systems that implement container technologies. Indeed, an industrial automation system may include a container orchestration system in an operational technology (OT) network. The container orchestration system may work in tandem with an informational technology (IT) network and/or industrial control systems to control, monitor, and otherwise manage devices of the industrial automation system. In this way, the container orchestration system may aid collecting and analyzing data from OT devices. Containers include packages of software that may include various elements needed to run in one or more software environments. As a result, containers may be deployed as individual software modules that perform specific operations or functions on the data provided to the respective container. Keeping this in mind, an industrial automation system is made up of many devices disposed in different network layers. Some devices are disposed in lower levels of a hierarchy, while other devices may be disposed on a higher level. Devices at relatively higher hierarchy levels may have the ability to view or access multiple devices on any level lower than and/or equal to its respective level. As such, containers operating on higher level devices may be better suited to perform macro-level analysis related to operations of a number of lower-level devices. Indeed, sometimes containers operating on higher level devices lack data of sufficient level of detail or granularity to effectively perform a desired monitoring or analysis operation.

With this in mind, systems and methods that dynamically deploy containers to different levels with the industrial automation system may benefit from periodic querying of the more granular, lower level device data. By doing so, a first container may access more detailed data obtained by a second container for a time period specified by the first container. This system may enable temporary performance of relatively more detailed analysis. Having access to more detailed data and/or analysis may improve performance of control or monitoring operations. Temporary performance of such granular data acquisition and/or analysis may improve industrial operations by not remaining a burden on processing or computing resources longer than desired by the container orchestration system to obtain requested data or perform the analysis.

As one example, a container orchestration system may monitor the one or more portions of the industrial automation system. If the container orchestration system detects an anomaly and/or receives data that is outside of an expected range of values, the container orchestration system may determine one or more locations within the industrial automation system to acquire additional or supplemental data that may assist a supervisory analysis system, such as an industrial control system, IT-side or cloud-implemented industrial automation monitoring system, or the like, to determine a root cause of the anomaly or provide maintenance recommendations to prevent maintenance issues. In some embodiments, based on the detected anomaly, the container orchestration system may identify devices that may contribute to the anomalous data. Based on the identified devices, the container orchestration system may deploy one or more desired containers to the identified devices, which may have sensors or data acquisition systems able to provide data related to the anomaly.

When considering where to deploy the desired containers, the container orchestration system may prioritize placing containers within different hierarchical levels, such that higher level containers may access the data acquired by lower-level containers to perform macro-level analysis. Sometimes the container orchestration system may prioritize placing containers as close as possible to the data source or desired location for the analysis. The desired location for the analysis may correspond to a relatively proximate physical or logical location (e.g., within a threshold logical distance and/or within a threshold physical distance) to a data source of data used in the analysis. In the same manner, the higher-level containers may provide data received from other components to lower-level containers to better perform micro-level analysis.

Moreover, container orchestration system may determine to deploy the one or more containers based on a trigger event, such as receiving scheduling metadata, receiving a command from an industrial automation device, or detecting a device being commissioned in the industrial automation system, or the like. Thus, in each of these examples, the container orchestration system may determine to deploy the containers based on a trigger event and may determine the specified start and end conditions associated with the container. These determinations may be made based on a schedule, based on an ongoing or expected computing resource use, based on a type of the device that the container is being deployed to, or the like. To deploy the container, the container orchestration system may interrupt one or more ongoing operations, deploy the container, then later resume the one or more previously ongoing operations or start new operations afresh.

The container orchestration system may deploy one or more containers based on priorities of the one or more containers relative to priorities of ongoing operations and/or actively deployed container to a particular device. Priority-based container deployment may occur when the container orchestration system determines that the one or more containers desired to be deployed conflict in timing and/or resource consumption. The conflict may be identified when the container orchestration system attempts to schedule. In these cases, the container orchestration system may perform operations to respectively evaluate relative priorities between the one or more desired containers when scheduling. To elaborate, the container orchestration system may receive an indication of multiple desired containers to be deployed to the one or more devices. The container orchestration system may determine multiple priorities for the multiple desired containers based on machine life cycle parameters associated with the respective multiple desired containers. The machine life cycle parameters may correspond to an end-of-life associated priority, a "double check" associated priority, a preventive maintenance associated priority, or the like, as is elaborated on below. The container orchestration system may also determine data acquisition parameters for each of the multiple desired containers. The data acquisition parameters may correspond to a frequency of data collection, a frequency of execution of the container to repeat data acquisition, a path to use to transmit acquired data, or the like. The data acquisition parameters may be user-defined metadata, metadata shipped with the container, metadata updated based on historical system performances, or the like. Based on the multiple priorities and the data acquisition parameters, the container orchestration system may determine a relative priority corresponding to the multiple desired containers and may deploy the multiple desired containers based on the relative priorities between the desired containers.

In some embodiments, the container orchestration system may generate a visualization via a human-machine interface. The visualization may include a visual indication of a detected alert and provide options with regard to locations in which certain containers may be deployed to assist in resolving the issue. The visualization may include a list of options for the types of containers that may be useful in resolving or attempting to resolve the detected issue. HMI may enable an operator to manage the deployment of any of the containers. The visualization may also be updated when the monitoring operation is completed via one or more containers to present results of the monitoring operation.

Additional details are discussed below with reference to FIGS. 1-8.

By way of introduction, FIG. 1 is a perspective view of an example industrial automation system 10 controlled by one or more industrial control systems 12. The industrial automation system 10 includes stations 14A through 14H having machine components and/or machines to conduct functions within an automated process, such as printed circuit board (PCB) manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 22 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 22. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 22 depicts representations of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 22. The person operating and/or monitoring the industrial automation system 10 may reference the display/operator interface 22 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system, on the other hand, may operate in an information technology (IT) environment. That is, the container orchestration system may include a cluster of multiple computing devices that coordinates an automatic process of managing or scheduling work of individual containers for applications within the computing devices of the cluster. In other words, the container orchestration system may be used to automate various tasks at scale across multiple computing devices. By way of example, the container orchestration system may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system may use configuration files to determine a network protocol to facilitate communication between containers, a storage location to save logs, and the like. The container orchestration system may also schedule deployment of containers into clusters and identify a host (e.g., node) that may be best suited for executing the container. After the host is identified, the container orchestration system may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a master node that retrieves the deployment configuration files from the container registry 26, schedules the deployment of pods to the connected nodes, and ensures that the desired state specified in the deployment configuration file is met. For instance, if a pod stops operating on one node, the master node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the master node in the container orchestration system 24. In this way, the master node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the master node of the container orchestration system 24. The limited features implementable by the container nodes 30 that operate in the passive-indirect mode may be limited to commands that the respective industrial control system 12 may implement using native commands that map directly to the commands received by the master node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the master node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the master node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the master node of the container orchestration system 24 on behalf of the industrial control system 12.

Additionally, the industrial control system 12 may share an OT device tree via the proxy node 32. As such, the proxy node 32 may provide the master node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
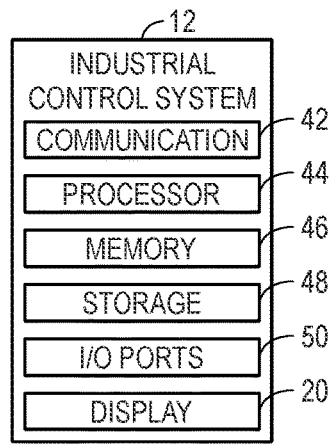
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44, a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
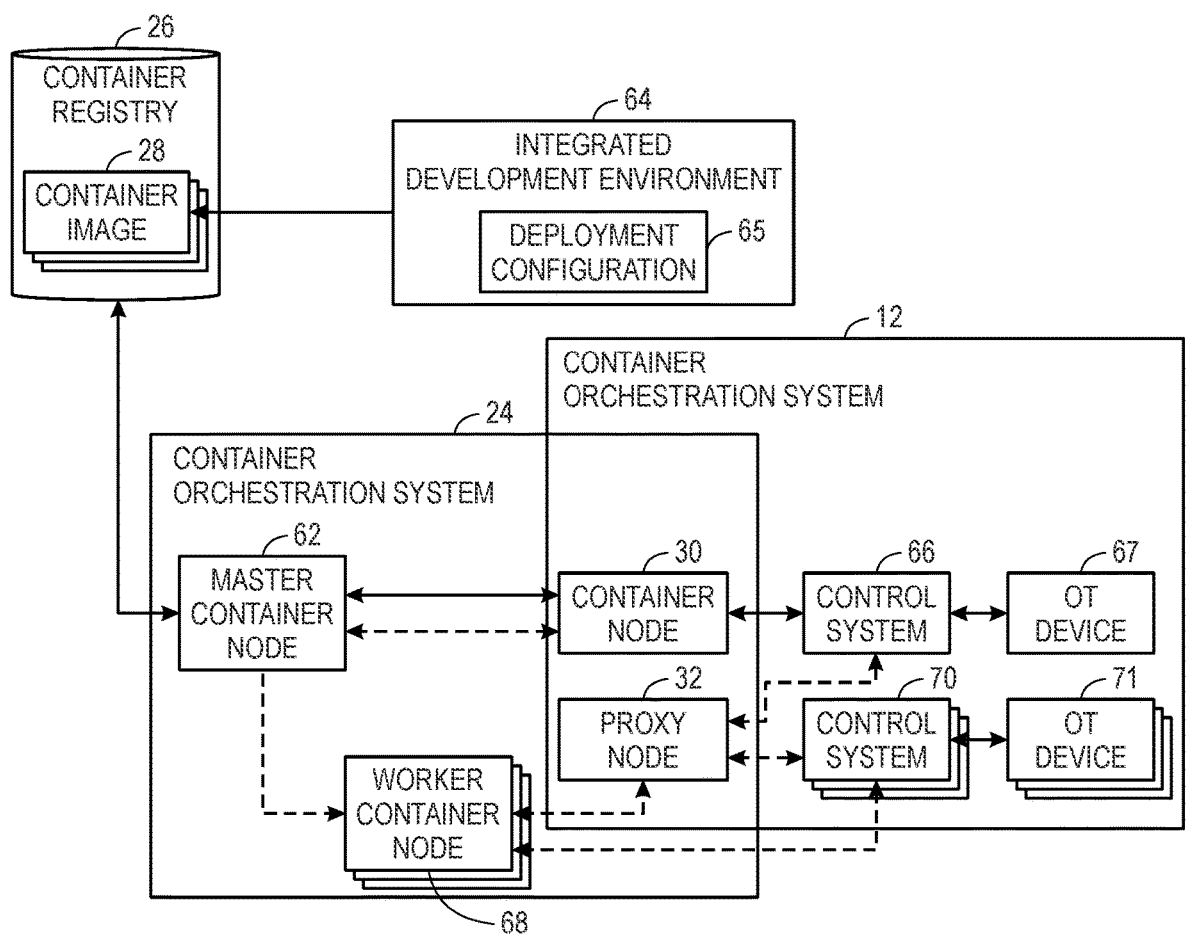
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a master node 62 that may execute control plane processes for the container orchestration system 24. The control plane processes may include the processes that enable the container orchestration system 24 to coordinate operations of the container nodes 30 to meet the desired states. As such, the master container node 62 may execute an applications programming interface (API) for the container orchestration system 24, a scheduler component, core resource controllers, and the like. By way of example, the master container node 62 may coordinate all of the interactions between nodes of the cluster that make up the container orchestration system 24. Indeed, the master container node 62 may be responsible for deciding the operations that will run on container nodes 30 including scheduling workloads (e.g., containerized applications), managing the workloads' lifecycle, scaling, and upgrades, managing network and storage resources for the workloads, and the like. The master container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the master container node 62 may receive the deployment configuration file 65 via the container registry 26, directly from the IDE tool 64, or the like. The master container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the master container node 62 may deploy containers to the container host nodes 30. That is, the master container node 62 may schedule the deployment of a container based on constraints (e.g., CPU or memory availability) provided in the deployment configuration file 65. After the containers are operating on the container nodes 30, the master container node 62 may manage the lifecycle of the containers to ensure that the containers specified by the deployment configuration file 65 is operating according to the specified constraints and the desired state.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as FactoryTalk LiveData, EtherNet/IP, Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the master container node 62. The node agent may or may not be the same as the proxy node 32 shown in FIG. 1. For example, the industrial control system 12 may include a programmable logic controller (PLC) that does not support an operating system (e.g., Linux) for receiving and/or implementing requested operations issued by the container orchestration system 24 12. However, the PLC may perform certain operations that may be mapped to certain container events. As such, the container node 30 may include software and/or hardware components that may map certain events or commands received from the master container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial automation system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the master container node 62, thereby bridging the gap between the IT-based container orchestration system 24 and the OT-based industrial control system 12.

Figure 4:
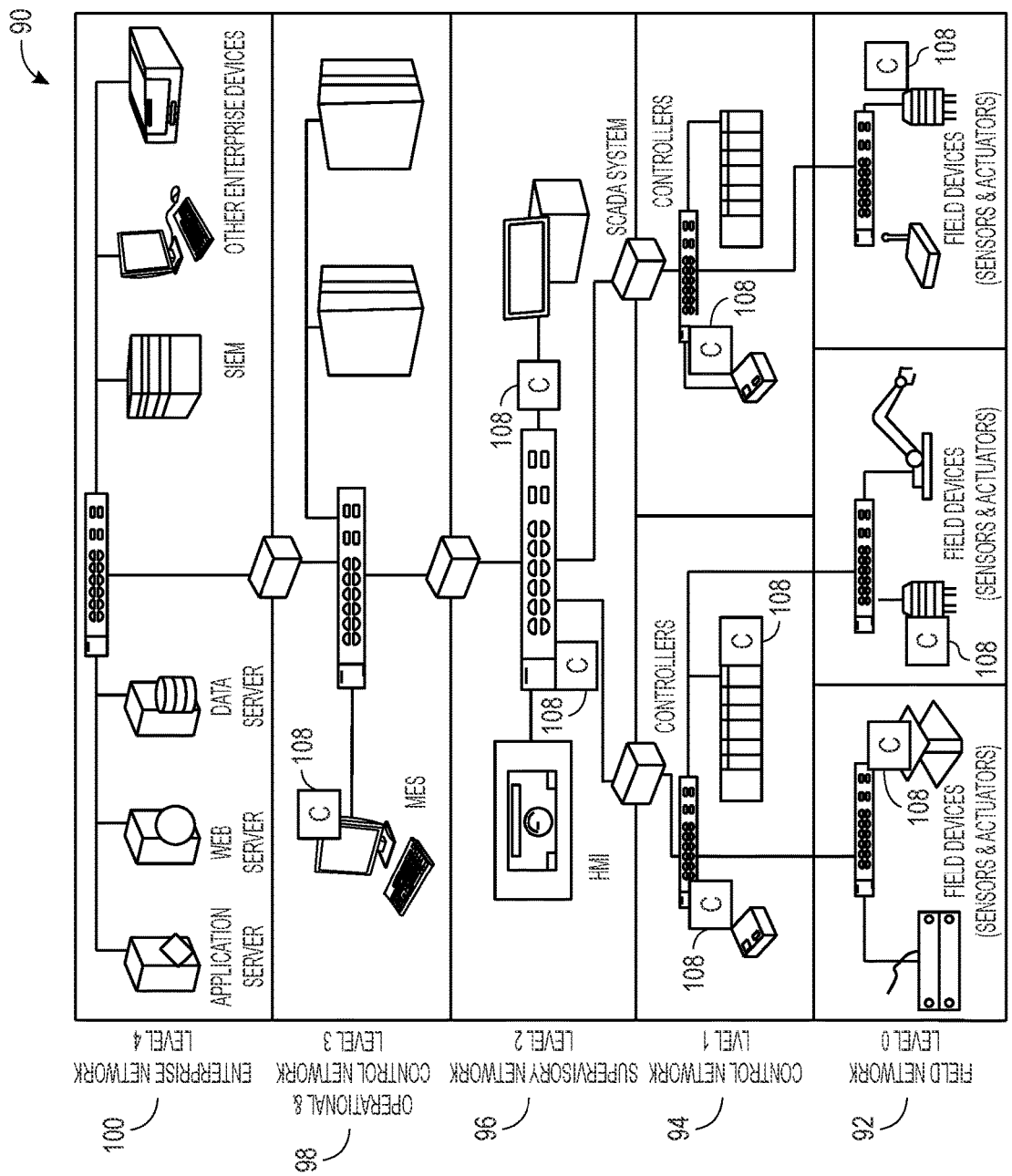
FIG. 4 is a sequence diagram illustrating the deployment of container pods to industrial control systems in the OT network of FIG. 3, in accordance with an embodiment.

With the foregoing in mind, a container orchestration system 24 may determine to deploy one or more containers to one or more lower hierarchy devices of the industrial automation system 10. FIG. 4, for example, is a schematic diagram 90 of the various levels of computing associated with an example industrial automation system 10. The hierarchical levels, in which the industrial automation system 10 may operate, include a field network level 92 (e.g., level 0), a control network level 94 (e.g., level 1), a supervisory network level 96 (e.g., level 2), an operational and control level 98 (e.g., level 3), and an enterprise network level 100 (e.g., level 4). Different control systems, controllers, software applications, devices, and computing systems may operate with each other within an enterprise to enable organizations to effectively control operations of components in the industrial automation system 10. For example, the physical process in which industrial components (e.g., machines) are employed to physically modify raw materials may be part of the physical process level, which may be controlled or monitored by components in an intelligent device level. The intelligent device level may include sensors, analyzers, actuators, and other instrumentation that may sense and manipulate the physical process. The industrial components at both the physical process level and the intelligent device level may be a part of the field network level 92. The field network level 92 involves the actual production process of transforming raw materials (e.g., grains, wheat) into products (e.g., cereal) as well as sensing and manipulating the production process within the industrial automation system 10 (e.g., food manufacturing plant). Containers deployed to the field network level 92 may be executed by local controller circuitry of respective sensors, actuators, OT device, or the like. It is noted that devices in higher network levels may be able to access data in lower network levels.

The control network level 94 may be positioned at a higher hierarchical level with respect to field network level 92. The control network level 94 may include controllers to provide supervising, monitoring, and controlling operations (e.g., continuous control, discrete control) for the physical process associated with the industrial components. When a container 108 is unable to be deployed to the field network level 92, sometimes the container 108 is deployed to a device in the control network level 94, which may be considered an edge device. The edge device running the container 108 may acquire data produced by devices, sensors, actuators in the field network level 92 and perform processing according to instructions associated with the container 108.

The supervisory network level 96 may be positioned at a higher hierarchical level with respect to the control network level 94 that regulates the controllers of the control network level 94. By way of example, the supervisory network level 96 may include real-time control hardware and software, HMI, programmable logic controller (PLC), supervisory and data acquisition (SCADA) software, and the like. The PLC may be an industrial solid-state computer that monitors inputs and outputs of the industrial automation system 10 and makes logic-based decisions for automated processes of the industrial automation system 10. Further, the SCADA may analyze real or near real-time data from industrial components and subsequently control the industrial components. Containers deployed to the supervisory network level 96 may have access to data acquired or generated by container 108 or devices in lower levels (e.g., field network level 92, control network level 94).

The operational and control level 98 may be positioned at a higher hierarchal level with respect to the supervisory network level 96. The operational and control level 98 may include manufacturing application system, which may any suitable IoT system that supports manufacturing processes. In some embodiments, the manufacturing application system may include manufacturing execution system (MES) or a manufacturing operations management (MOM) that manage production workflow to produce the desired products, batch management, laboratory, maintenance and plant performance management systems, data historians, related middleware, and the like. The MES and MOM may involve monitoring data with respect to various time frames, such as duration of communication between components, minutes, seconds, and the like. Containers deployed to the operational and control level 98 may have access to data acquired or generated by container 108 or devices in lower levels (e.g., field network level 92, control network level 94, supervisory network level 96).

In particular, the MES may include a number of software and hardware components that operate together to monitor the operations of the various components (e.g., databases, servers, devices) that are used to perform the manufacturing operations. The infrastructure of the manufacturing applications system may include the software and hardware components that control the distribution of data and information between various components in the manufacturing application system level and other levels discussed above. By way of example, the components of the manufacturing application system may include a server, a database, a database server, an application server, network controllers, routers, interfaces, and the like. In addition, the components of the manufacturing application system may include software applications and processes that operate to control the flow of data and information between the various components employed by the manufacturing applications systems.

Positioned above the operational and control level 98, the enterprise network level 100 may manage business-related activities of the manufacturing operation. For instance, the enterprise network level 100 may establish production schedule, material use, shipping, and inventory levels to support the operations monitored by the components (e.g., databases, servers) in the operational and control level 98. The enterprise network level 100 may also include application servers, web servers, data servers, security information and event management (SIEM), and other enterprise devices. Containers deployed to the enterprise network level 100 may have access to data acquired or generated by container 108 or devices in lower levels.

Devices in each of these levels may correspond to different hierarchical locations within the device hierarchy. Hierarchical locations may be generally arranged based on the levels. A hierarchical location of a device may indicate the physical or logical placement of the device within the industrial automation system 10 device hierarchy (e.g., represented via schematic diagram 90). When designing and/or managing control operations within the industrial automation system 10, the hierarchical locations may be considered since the hierarchical locations may impact latency, communication speeds, and/or power consumption.

As mentioned above, a container 108 deployed in the industrial automation system 10 may be a data collecting (e.g., data acquisition) process that monitors for specific data produced by one or more devices for a threshold duration of time or quantity of data, may perform one or more operations based on computer-implemented instructions associated or contained within the infrastructure of the container 108, or the like. Once a threshold amount of data is gathered or a threshold amount of time has been reached, or data is received from a data source, the container 108 may commence processing, analysis, and/or transmission of the data to be sent to a different device in a same or different level. In this way, some container 108 may be non-perpetual operations that have distinct start and end times. When a container 108 completes its operation, it is terminated and no further computing resources or memory are dedicated to that container 108 at the deployed device Deploying the one or more containers 108 may be based on a trigger event, such as receiving scheduling metadata, receiving a command from an industrial automation device, or detecting a device being commissioned in the industrial automation system 10, or the like. These examples and others are described herein. However, it should be understood that other deployment conditions or considerations may be used when determining whether to deploy a container 108 to another device in the hierarchy.

Figure 5:
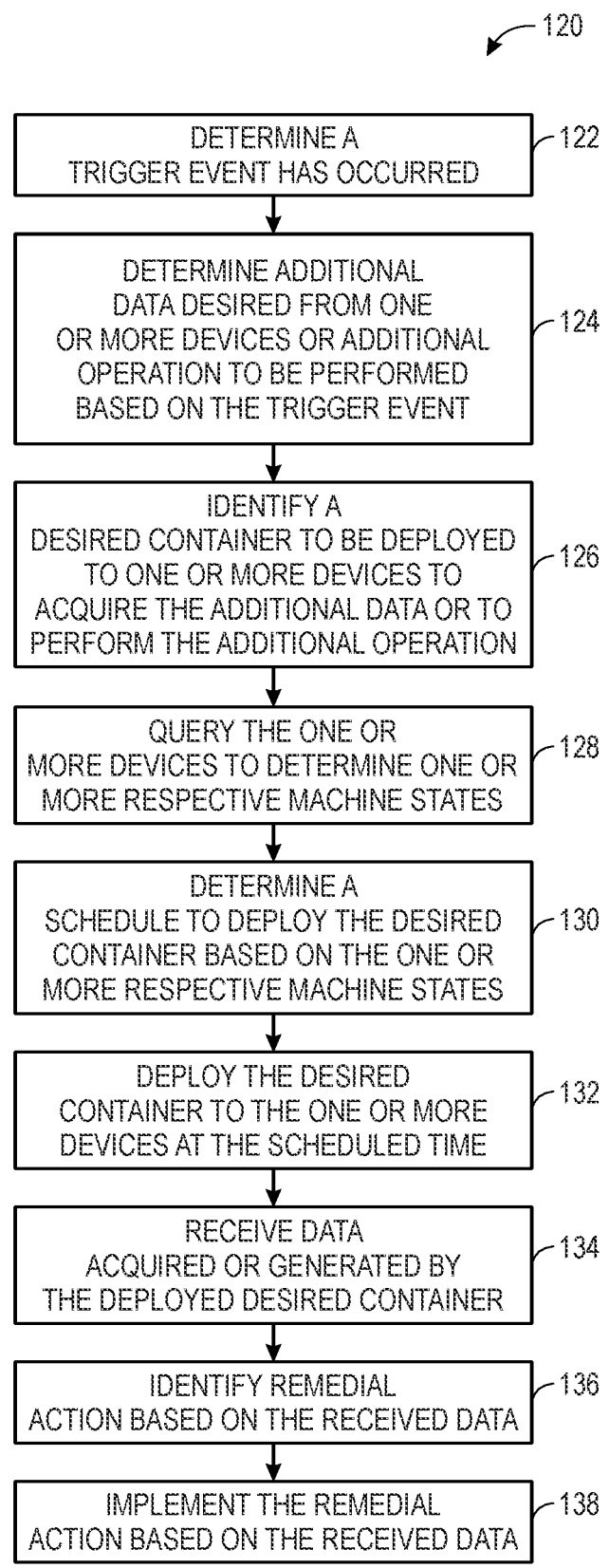
FIG. 5 is a flow chart of a method that the container orchestration system of FIG. 3 may perform when deploying a container to one or more devices based on a trigger event, in accordance with an embodiment.

To elaborate on container 108 scheduling operations, FIG. 5 depicts a flow chart of a method 120 that the container orchestration system 24 may perform when deploying a container 108 to one or more devices based on a trigger event. Although the following description of the method 120 is described as being performed by the container orchestration system 24, it should be understood that any suitable container node 30 that is configured to interface with the cluster of nodes of the container orchestration system 24 and the industrial control system 12 may perform the operations described herein. In addition, although the method 120 is described in particular order, it should be understood that the method 120 may be performed in any suitable order.

The container orchestration system 24 may, at block 122, determine a trigger event has occurred. The trigger event may correspond to the container orchestration system 24 detecting an operational anomaly, such as detecting when operations differ from a historic trend of operation, detecting when sensing data obtained exceeds or cross a set threshold corresponding to that type of sensing data, or the like. In some systems, the trigger event corresponds to the container orchestration system 24 receiving a device request to deploy the container 108. For example, an industrial automation device may request additional analysis be performed and/or additional data be acquired by transmitting the request to the container orchestration system 24 to trigger the deployment of the container 108. In some cases, the trigger event corresponds to scheduling metadata, such as scheduling metadata indicative of a maintenance schedule or other type of reporting schedule. Indeed, the reporting schedule may be used to repeatedly receive the same type of analysis or data from a deployed container 108 in response to a defined time period, such as "perform analysis X every 24 hours at 6:00." The container orchestration system 24 may include or communicatively couple to a time keeping device that tracks passage of time to aid in scheduling containers 108, to deploy containers 108 according to a schedule, to determine when to deploy a container 108, and the like.

Indeed, at block 124, the container orchestration system 24 may determine additional data desired from one or more devices and/or an additional operation to be performed at the one or more devices based on the trigger event. The container orchestration system 24 may use the trigger event and/or information determined associated with the trigger event to identify one or more devices to target and what data to target. Containers 108 may be deployed by the container orchestration system 24 to obtain the targeted data. Examples of operations that a container 108 may be used to perform include time-domain statistics (e.g., maximum determinations, minimum determinations, average determinations, root-mean-square determinations, standard deviation determinations) over a certain period (e.g., time period, data-sampling quantity period), frequency-domain features (e.g., perform a Fast Fourier Transform (FFT) to extract magnitude at a particular frequency), other relatively more complex operations, such as custom programs deployed and/or digital twin models, or the like.

Different containers 108 may be deployed to different devices depending on the type of targeted device and the characteristics of the targeted data. Any suitable additional data and/or devices may be identified as targets. For example, a device to deploy the container 108 to may or may not be an OT device 67, 71. In some cases, the container orchestration system 24 may deploy containers 108 to IT devices, devices in device hierarchical levels above level 0 (e.g., devices in a level higher than a field network level 0 92), device in the field network level 0, OT device 67, 71, or the like, and thus devices referred to in FIGS. 5-8 may refer to one or more of these various devices.

The container orchestration system 24 may identify the additional data and/or the one or more devices based on a device hierarchy, such as a system topology. The device hierarchy thus includes up-to-date indications of computing layers, devices, containers 108 or the like that may respectively produce, acquire, or have the ability to inspect various datasets. The container orchestration system 24 may identify the additional data and devices based on relationships between devices indicated in the device hierarchy. The relationships may be connections between the devices that cause interdependencies of the industrial automation system 10 operations to the devices. In this way, the relationships may indicate an operational connection between the device related to the trigger event and other devices also related to the device. For example, an anomalous operation in one OT device 67 may affect operations downstream or upstream of that OT device 67 or an associated portion of the industrial automation system 10. Thus, the container orchestration system 24 may deploy containers 108 to one or more devices upstream, downstream, or otherwise found related to the OT device 67, where the relation between OT devices 67, 71 or other devices of the industrial automation system 10 may be reflected in the device hierarchy.

The trigger event may correspond to the container orchestration system 24 detecting or receiving indication of an operational anomaly (e.g., anomaly detection). The anomaly detection may be performed by a container 108 deployed in the industrial automation system 10 and/or by an industrial automation device that has indicated the anomaly. Sometimes, the industrial control system 12 may work in concert with the container orchestration system 24 to identify when anomalous events occur and are to be further investigated via deployment of additional containers 108. Moreover, OT devices 67, 71 may sometimes perform anomaly detection, such as when local control circuitry processing sensing data acquired by a local sensor. The operational anomaly may correspond to a current operation deviating from an expected operation by a threshold amount of value. For example, the operational anomaly may correspond to a sensor acquiring data that indicates a motor is rotating at a speed 10% greater than a normal operational speed and thus may trigger an indication of operational anomaly to be received by the container orchestration system 24. In any of these cases, an alert may be generated and delivered to (or identified by) the container orchestration system 24 and the container orchestration system 24 may determine the alert to be a trigger event. The alert may be communicated via a status accessible by the container orchestration system 24.

The trigger event may correspond to the container orchestration system 24 receiving a request from a container 108 requesting data acquirable by a device, where the container 108 may be in a relatively higher level than the lower level device. The request may include metadata or indications of parameters and/or operations by which to perform the request. Sometimes the container orchestration system 24 may determine the additional data based on data indicated by the request. For example, the request may include an indication of additional data or target device requested by a container 108. In some cases, the container orchestration system 24 may use one or more containers 108 to process raw data from a lower level device into transformed data for transmission to higher level or edge devices. In this way, the processed raw data may have a slower data rate than the raw data obtained at the lower level device and thus be easier to handle when transmitting to the higher level devices. Thus, the container orchestration system 24 may down-sample the data and reduce the amount of data transmitted up the device hierarchy (e.g., represented via schematic diagram 90), and thus the amount of data being handled by edge devices, data servers, web servers, other memory, or the like.

Figure 6:
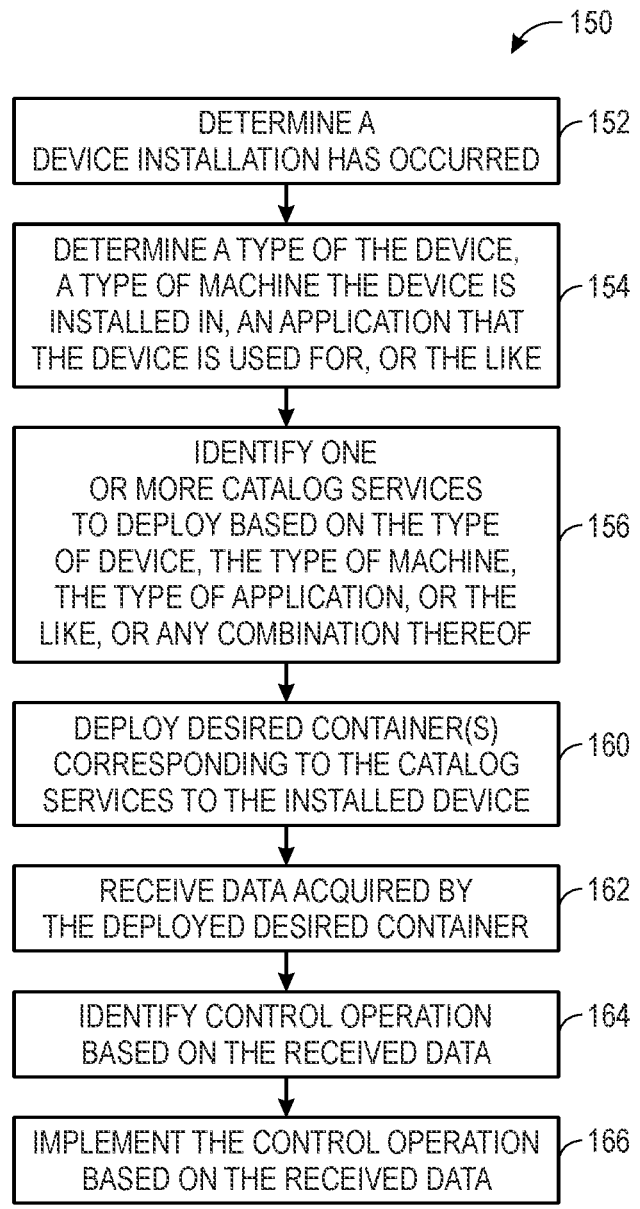
FIG. 6 is a flow chart of a method that the container orchestration system of FIG. 3 may perform when deploying a container to one or more devices based on a trigger event corresponding to a device installation, in accordance with an embodiment.

Moreover, the trigger event may correspond to a device installation, as further elaborated on in FIG. 6. For example, a container 108 that monitors network communications may be deployed to identify when a new device is added. When a device is added to the industrial automation system 10, the container 108 may add an indication of the device to the device hierarchy. The container orchestration system 24 may monitor the device hierarchy and associate the addition of the indication of the device as a trigger event. Thus, the container orchestration system 24 may associate the addition of the indication of the device as being the trigger event of block 122.

Indeed, once the additional data and/or operations and the one or more targeted devices are identified at block 124, the container orchestration system 24 may, at block 126, identify one or more containers 108 desired to be deployed to the one or more devices to acquire the additional data. The container orchestration system 24 may identify the desired containers 108 by searching the container registry 26 for an indication of compatible containers with the one or more devices that result in acquisition of the additional data identified at block 214.

Sometimes, additional containers 108 are deployed to acquire additional data to be used to determine what containers 108 to be deployed to a target device in response to a trigger event. These additional containers 108 may be deployed in addition to the container 108 or as the container 108 to be identified in block 126.

Some application specific (e.g., type of device-specific) containers 108 may perform specific types of functions (e.g., artificial lifts) for a consumer. Since these types of containers 108 may not be used by most consumers within the industrial automation system 10, the container 108 often rely on shared data sources to obtain data used for performing the respective function. However, the shared data sources (e.g., database, storage) may not provide a sufficient level of detail or granularity to effectively perform the function. For example, a shared data source may store data with relatively low data rates (e.g., less than a threshold) compared to that of data obtained at an original source of the data. With this in mind, the container orchestration system 24 may coordinate with the application specific container 108 that may have generated the request received at block 122 to deploy a data acquisition container 108 closer to the respective data sources (e.g., the identified device of FIG. 5) to acquire data that may be passed directly to the application-specific container 108 (e.g., device-type specific container 108).

Referring to operations of blocks 122-126 together, in one example, the container orchestration system 24 may determine the trigger event has occurred at block 122 and determine a subset of devices related to the trigger event at block 124. The subset of devices may be associated with one or more hierarchical levels of the industrial automation system 10. In association with operations of block 124, the container orchestration system 24 may determine a subset of the one or more hierarchical levels as being associated with the subset of devices. Based on any combination of the subset of hierarchical levels, the subset of devices, desired additional data, the additional operation to be performed, or the like, the container orchestration system 24 may identify one or more containers 108 to be deployed to one or more devices. For example, the container orchestration system 24 may, at block 126, identify one or more containers 108 to be deployed to one or more devices of the subset of devices based on the subset of the one or more containers 108 and the trigger event and/or may identify one or more containers 108 to be deployed based on the desired additional data and one or more devices of the subset of devices. Sometimes the trigger event corresponds to an alert being generated and thus the container orchestration system 24 may, at block 126, identify the one or more containers 108 to be deployed to one or more devices of the subset of devices based on the subset of the one or more containers 108 and the alert, such as which device corresponds to the alert. In some cases, the device corresponding to the alert or generating the alert is different from the one or more devices that receive the one or more containers 108. Moreover, the device corresponding to the alert or generating the alert may be located in a different hierarchical level from the one or more devices that receive the one or more containers 108 and/or the container orchestration system 24 coordinating the container 108 deployment.

In some cases, the desired additional data corresponds to a first amount of data and the data acquired by the one or more devices corresponds to a second amount of data. When the container 108 deployed to the one or more devices performs a processing operation, the container 108 may generate the desired additional data based on the data acquired by the one or more devices, which may sometimes result in dataset reducing in size, changing in frequency, or like between data acquisition and data reporting. The reduction in dataset size or reduction of frequency of reporting may improve industrial automation system 10 operation by reducing a size of data being stored or transmit to perform control operations and/or by slowing a frequency associated with a data set. In this way, a first amount of data generated by the device may be different from (e.g., greater than) a second amount of data transmitted to the container orchestration system 24. Similarly, a first amount of data transmitted to the container orchestration system 24 based on operations of the container 108 may be less than a second amount of data generated by the device. Sometimes the reduced dataset (e.g., desired additional data) is transmitted to the container orchestration system 24 without the data acquired by the one or more devices (e.g., sensing data) also being transmitted to container orchestration system 24. In some cases, the container orchestration system 24 may access the desired additional data by accessing a template instance associated with symbolic data access methods.

Before deploying the container 108 identified at block 126, the container orchestration system 24 may, at block 128, determine which containers 108 are already deployed based on its record of previously deployed containers 108 and/or a list of containers currently being executed. The container orchestration system 24 may retrieve machine state data from one or more control systems associated with the one or more devices, such as the control system 66. The machine state data may include current operational state (e.g., active, inactive) of a respective OT device (e.g., a respective device of the one or more devices) controlled by the control system, available processing resources (e.g., CPU availability), available memory resources (e.g., storage, RAM), and the like. The machine state data may also indicate whether any containers are being executed by the control system 66. As such, the machine state data may be reported back to the master container node 62 to ensure that the desired state specified by the deployment configuration file 65 is present.

Based on which containers 108 are actively being executed, the container orchestration system 24 may, at block 130, determine a schedule of times by which to coordinate container 108 deployment. The container orchestration system 24 may do so based on the machine state data. For example, based on available processing resources (e.g., CPU availability), available memory resource, and respective data about the currently executed containers, the container orchestration system 24 may schedule and/or deploy the desired container 108.

The container orchestration system 24 may, at block 132, deploy the desired containers 108 based on the schedule of times determined at block 130. One or more containers 108 identified at block 126 may be deployed at different times based on the available processing resources, available memory resources, and respective data about the currently executed containers. By scheduling container 108 deployment, regular operating containers 108 may be balanced with the containers 108 desired to be deployed in response to the trigger event.

After a container 108 is deployed, the container orchestration system 24, at block 134, may receive data acquired by or generated by the deployed container 108. The deployed container 108 may expose the data acquired or generated via symbol and template data access methods, via direct messaging operations, by exposing the data via consumer/producer data access methods, where the container orchestration system 24 may subscribe to data generated by the deployed container 108, or the like. Indeed, any suitable data transmission or communication method may be used to communicate data between the container orchestration system 24 and the deployed container 108.

At block 136, the container orchestration system 24 may identify a remedial action based on the received data and, at block 138, may implement the remedial action based on the received data. To do so, the container orchestration system 24 may diagnose a condition of the device based on the collected data and/or an operational signature determined based on the processing of collected data. For example, the container orchestration system 24 may as a result of the analysis of the collected data and/or the motor signature, may identify a condition of the device (e.g., faults, out of balance, misalignment, worn bearings, rotor bar damage, load issues, dynamic eccentricity, static eccentricity, cavitation, component wear, machine jams, capping anomalies, contamination, a broken seal, a malfunctioning sensor, the presence of malware, ransomware, or spyware, an oil leak, dirty oil, a blown fuse, out of date firmware or software) based on the collected data and/or an operational signature determined based on the processing of collected data. The diagnosis may be made using machine learning, historical data, workflows, decision trees, lookup tables, or some combination thereof.

An identified remedial action may be determined by the container orchestration system 24 to address the diagnosed condition or the motor. The one or more remedial actions may be identified by the data acquisition container 108 or by another container 108 (e.g., container 108 implemented in a device involved in the analysis, such as an edge device, or a different device). The remedial actions may be determined via a lookup table, a script, an algorithm, a machine learning model, accessing a database, following a workflow or decision tree, analysis of historical data, and so forth, and may involve the container orchestration system 24 coordinating a remedial control operation with the industrial control system 12, updating an indication of a maintenance schedule to schedule one or more recommend remedial maintenance actions, or the like. The remedial actions may include, for example, generating a control signal to adjust an operating parameter (e.g., speed of rotation, frequency of operation, power), recommending a maintenance action like replacing and/or servicing bearings, clearing a machine jam, adjusting fasteners, replacing a seal, or the like, performing a maintenance operation like performing a calibration operation on a component, updating software/firmware, and so forth. In some embodiments, the container orchestration system 24 may automatically implement remedial actions. For example, certain remedial actions may be pre-approved or otherwise indicated in metadata for automatic implementation. In other embodiments, the container orchestration system 24 may propose one or more remedial actions to a user for approval/selection before implementation. Further, other remedial actions (e.g., replacing a seal, replacing a component, clearing a machine jam, replacing a hose) may be recommended to be performed and/or automatically added to maintenance records to be performed. If the condition persists or is otherwise unresolved, some or all of the operations to deploy containers 108 may be repeated with a different diagnosis and/or remedial action. After the condition has been resolved (e.g., a confirmation is received that the condition has been resolved and the OT device is operating as expected) or another condition is met, the container 108 may be spun down or otherwise stopped so the resources utilized by the container 108 may be made available for other functions.

In some cases, the device identified at block 124 may not support the execution of the container 108, as may occur when the device is incompatible with container 108 technologies or specifications indicated in the deployment configuration file 65 associated with that container 108. In these cases, the container orchestration system 24 may receive information related to the identified device and determine that the identified device is unable to execute the container 108. The container orchestration system 24 may reference the device hierarchy (e.g., an indication of the hierarchy of FIG. 4 or of a similar hierarchy for a different specific system) to find a next closest suitable device or compute surface to deploy the container 108, which may be in a computing layer above the computing layer having the identified device. A compute surface may correspond to a set of resources of the industrial automation system device that are available for containers 108 to be deployed to such that one or more software tasks may be performed by the device on behalf of the container 108. In some cases, the container orchestration system 24 identifies an edge device that is more suitable to deploy the desired container 108. The container orchestration system 24 may deploy the desired container to the edge device, which may cause one or more operations to be performed and data to be acquired and transmitted back to the container orchestration system 24 and/or another device for further use.

In some cases, the trigger event determined at block 122 corresponds to a device installation operation. To elaborate, FIG. 6 depicts a flow chart of a method 150 that the container orchestration system 24 may perform when deploying a container 108 to one or more devices based on a trigger event corresponding to a device installation. Although the following description of the method 150 is described as being performed by the container orchestration system 24, it should be understood that any suitable container node 30 that is configured to interface with the cluster of nodes of the container orchestration system 24 and the industrial control system 12 may perform the operations described herein. In addition, although the method 150 is described in particular order, it should be understood that the method 150 may be performed in any suitable order.

In this example, at block 152, the container orchestration system 24 may identify, as a trigger event, that a device installation occurred. As part of device commissioning operations, the control system may generate and send an indication to the container orchestration system 24 to communicate the installation of the new industrial automation device. In some cases, a message is sent to a control system by a newly installed industrial automation device to communicate its installation to the control system. In some cases, the container orchestration system 24 may perform a device walking operation that determines when a device is installed within one of the hierarchical layers of FIG. 4 based on a change to a communication network, a header received, or the like. Other methods may be used by the container orchestration system 24 to determine when the device installation occurred In response to the identification, the container orchestration system 24 may, at block 154, determine a type of device that was installed, a type of machine that the device is installed in, an application that the device is being used for, child devices of the device, or the like. Based on the information identified at block 152, the container orchestration system 24 may, at block 156, identify one or more catalog services to deploy to the newly installed device. Catalog services may correspond to one or more containers that are to be loaded to a compute surface on or proximate to the newly installed device to aid in industrial automation system 10 operations, like data analysis and acquisition. In this way, certain device types, related machines, or corresponding industrial operations may be associated with different catalog services, and thus different containers, to collect desired data, perform desired operations, or the like. In addition to determining the containers to deploy based on the type of device, the container orchestration system 24 may identify the container 108 to be deployed based on the machine type the device is installed in or the application that the device is being used for.

The container may also be determined based on the knowledge of the presence of any child devices connected to the main device. These child devices may be detected and/or known by the device, which could be reported to the container orchestration system 24. For example, the container orchestration system 24 may receive an indication that a servo drive device has a gearbox connected to a motor shaft of the servo drive device. The indication may be received from a computing device based on a user input received via a GUI or a design software. In some cases, the indication may be received based on an industrial automation device "walking" operation that searches the hierarchical levels for indications of related devices. Given this context information, the container orchestration system 24 may determine to deploy a gearbox health-related container to the servo drive device based on catalog services related to the gearbox known to be connected to the servo drive device.

Once identified, the container orchestration system 24 may, at block 160, deploy the one or more containers 108 corresponding to the catalog services to the newly installed device. To do so, the container orchestration system 24 may deploy the container 108 using any suitable methods, including deployment methods described herein. After deploying the container 108, the container orchestration system 24 may, at block 162, receive data acquired by the one or more containers 108 and, at block 164, may identify any subsequent control operations to be performed based on the received data. The container orchestration system 24 may determine a control operation to perform to remediate a condition indicated by the received data or determined to be occurring based on operations performed by the container 108. Example control operations may include performing a remedial action, generating a notification to be rendered on a graphical user interface informing of a condition indicated by the received data, adjusting an operation of an industrial automation device in response to a condition being met, or the like.

At block 166, the container orchestration system 24 may implement the control operation identified at block 164. The container orchestration system 24 may work in concert with the industrial control system 12 to remediate an operation of a device. Thus, the container orchestration system 24 implementing the control operation may involve the container orchestration system 24 instructing the industrial control system 12 to perform an operation to at least partially implement the control operation.

Referring back to FIG. 5, in some cases, the container orchestration system 24 may determine that no additional container 108 may be deployed to the one or more devices based on the machine states due to computational restrictions. In these cases, the container orchestration system 24 may pause or remove a container 108 to allow computational room for the one or more containers 108 identified in FIG. 5. To do so, the container orchestration system 24 may follow operations of FIG. 7.

Figure 7:
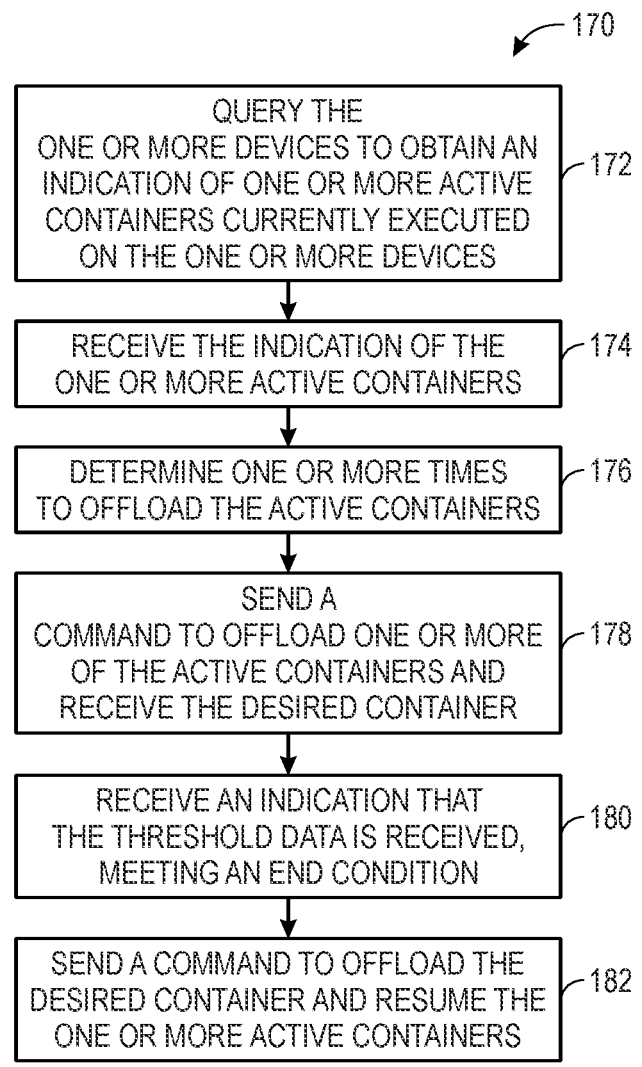
FIG. 7 is a flow chart of a method that the container orchestration system of FIG. 3 may perform when deploying a container to one or more devices to pause or remove an active container to make computational room for one or more containers (e.g., identified via operations of FIG. 5), in accordance with an embodiment.

To elaborate, FIG. 7 depicts a flow chart of a method 170 that the container orchestration system 24 may perform when deploying a container 108 to one or more devices based on a trigger event corresponding to a device installation. Although the following description of the method 170 is described as being performed by the container orchestration system 24, it should be understood that any suitable container node 30 that is configured to interface with the cluster of nodes of the container orchestration system 24 and the industrial control system 12 may perform the operations described herein. In addition, although the method 170 is described in particular order, it should be understood that the method 170 may be performed in any suitable order.

Indeed, the container orchestration system 24 may, at block 172, query the one or more devices to obtain an indication of one or more active containers 108 currently executed on the one or more devices. The indication of the active containers 108 executed on the one or more devices may be included in machine state data. The machine state data may include indications of a current operational state (e.g., active, inactive) of a respective device and/or any sub-devices (e.g., child devices) related to the respective device, available processing resources (e.g., CPU availability) associated with the respective device, available memory resources (e.g., storage, RAM) associated with the respective device, and the like. The machine state data may also indicate whether any containers are being executed by the respective device and/or by a local control system of the respective device. As such, the machine state data may be reported back to the container orchestration system 24 from the one or more devices and/or associated control systems and, at block 174, the container orchestration system 24 may receive an indication of the one or more active containers 108 via the machine state data. For example, the container orchestration system 24 may receive an indication of the active containers 108 operating on the OT device 67 when receiving machine state data from the control system 66.

At block 176, the container orchestration system 24 may determine one or more times to offload the active containers 108 based on the indication of the active containers 108. When the machine state data indicates that the target device is overloaded from a computational standpoint, the container orchestration system 24 may determine to stop or pause one or more of the active containers 108 to make room for the desired container identified at block 126. The container orchestration system 24 may determine which of the active containers 108 to pause or stop based on priorities of the active containers 108 relative to each other and relative to the desired container 108. If the desired container 108 has a priority lower than or equal to that of the active containers 108, the container orchestration system 24 may not offload the active containers 108 and wait until one or more of the active containers 108 have stopped processing. If the desired container 108 has a priority greater than that of the active containers 108, the container orchestration system 24 may identify one or more of the active containers 108 to offload where offloading the identified active containers 108 is expected to free a suitable amount of computational resources. The suitable amount of computational resources expected to be freed may equal or exceed an amount of computational resources expected to be used by the desired container 108. In some cases, the container orchestration system 24 may determine a variety of combinations of active containers 108 being offloaded and determine the combination that offloads a fewest number of lowest priority active containers 108, or other suitable combination. In some cases, the container orchestration system 24 may offload one or more active containers 108 in accordance with offloading rules, which, as an example, may stop (or instruct to not) offloading certain types of containers 108, certain priorities of containers 108, or the like. The offloading rules may be device-specific, hierarchical level-specific, operational unit-specific, operation-specific, or the like. In this way, the container orchestration system 24 may determine to offload one or more containers 108 based on one or more offloading rules and applying the one or more offloading rules to the targeted device based on the desired container 108. For example, the container orchestration system 24 may determine the offloading rule based on the target device (e.g., current available computation resources, computational resources expected to be consumed by one or more active containers for a duration of time corresponding to operating a set of containers), the set of containers (e.g., types of one or more containers, priorities of one or more containers, computational resources expected to be consumed by one or more containers), a hierarchical level of the first device, or any combination thereof.

The container orchestration system 24 may, at block 178, send a command to offload one or more of the active containers 108 and receive the desired container 108 (e.g., of FIG. 5). The command to offload may be an interrupt or involve an interrupt that stops otherwise ongoing computing operations, thereby allowing new operations to be performed. As part of the offloading operation, the device may save or transmit an indication of its machine state to a memory (e.g., a cache) that enables re-loading of the operation where it was interrupted to the device, generally causing a brief pause in the original active container operation. Once the desired container 108 is received by the one or more devices, the one or more devices may autonomously execute the desired container 108 and commence data acquisition or analysis operations corresponding to the desired container 108.

At some time later, the container orchestration system 24 may, at block 180, receive an indication that the threshold data is received, meaning that an end condition of the desired container 108 was met. End conditions may be defined stopping points at which to stop a deployed container 108. A container 108 may be made non-perpetual by associating the container 108 with an end condition. End conditions may relate to a time period (e.g., a container is deployed for a specified period of time), to an amount of data acquired (e.g., N voltage samples with a sampling rate of X samples per minute), or the like. Once the end condition is met, such as a suitable amount of time passing or suitable amount of data is acquired, the deployed container 108 may generate an indication that the end condition is met.

In response to receiving the indication, the container orchestration system 24 may, at block 182, send a command to offload the desired container 108 (e.g., desired container of block 160, 126) and to resume the one or more active containers 108 (previously offloaded). To resume the previously active container 108, the container orchestration system 24 may transmit an indication of the machine state at the interrupt performed at block 178, which enables the device to resume the previously paused operations. If the active container 108 was stopped, the container orchestration system 24 may repeat deployment of the previously stopped active container 108.

With the foregoing in mind, sometimes the one or more desired containers 108 conflict in timing and/or resource consumption when the container orchestration system 24 attempts to schedule in FIG. 5. In these cases, the container orchestration system 24 may perform operations in FIG. 8 to respectively evaluate relative priorities between the one or more desired containers 108 when scheduling, such as when determining a schedule at block 130.

Figure 8:
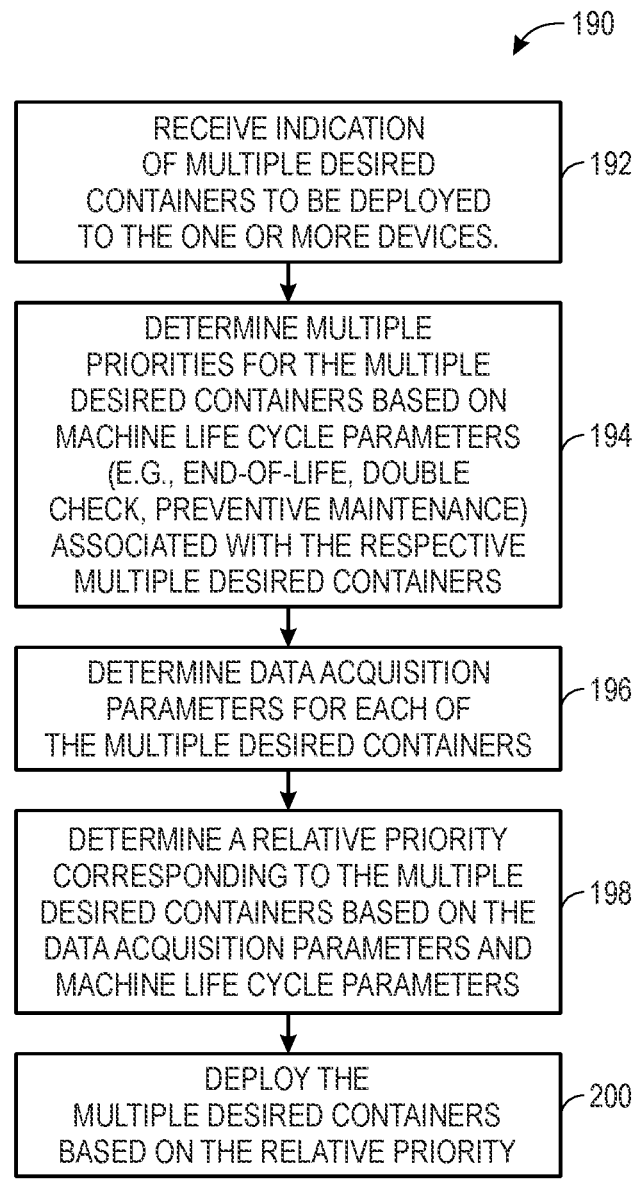
FIG. 8 is a flow chart of a method that the container orchestration system of FIG. 3 may perform when deploying a container to one or more devices to resolve one or more scheduling conflicts, in accordance with an embodiment.

To elaborate, FIG. 8 depicts a flow chart of a method 190 that the container orchestration system 24 may perform when deploying multiple desired container 108 to one or more devices and there is a conflict in timing or expected resource consumption. Although the following description of the method 190 is described as being performed by the container orchestration system 24, it should be understood that any suitable container node 30 that is configured to interface with the cluster of nodes of the container orchestration system 24 and the industrial control system 12 may perform the operations described herein. In addition, although the method 190 is described in particular order, it should be understood that the method 190 may be performed in any suitable order.

To elaborate, the container orchestration system 24 may, at block 192, receive an indication of multiple desired containers 108 to be deployed to the one or more devices. Indeed, at block 126 of FIG. 5, the container orchestration system 24 may identify multiple desired containers 108 for deployment. Based on the indications, the container orchestration system 24 may determine that deploying each of the desired containers 108 is expected to cause a conflict in timing or resource consumption. Thus, the container orchestration system 24 may consider priorities of the multiple desired containers 108 to determine which to deploy first in the schedule of block 130 of FIG. 5.

To do so, the container orchestration system 24 may, at block 194, determine multiple priorities for the multiple desired containers 108 based on machine life cycle parameters associated with the respective multiple desired containers 108. The machine life cycle parameters may correspond to an end-of-life associated priority, a "double check" associated priority, a preventive maintenance associated priority, or the like. These parameters may be indicated in a lookup table defining various characteristics of respective containers able to be deployed from the container registry 26. In some cases, the indication itself may include an indication of the machine life cycle parameters. The machine life cycle parameters may be user-defined metadata, metadata shipped with the container 108, metadata updated based on historical system performances, or the like.

Elaborating further on the machine life cycle parameters, the machine life cycle parameters may correspond to a stage in a complete device life cycle of the device. Data and threshold analysis of the acquired data may be used to gauge whether a container 108 deployment should be made with a higher priority. For example, a container 108 associated with a regularly performed preventative maintenance operation may be ranked with relatively lower priority than a container 108 associated with an urgent operation, where delaying performance of the urgent operation could reduce an operational quality or end the life of the device. The machine life cycle parameters may correspond to an end-of-life associated priority, a verification associated priority, a preventive maintenance associated priority, or the like. The end-of-life associated priority corresponds to metadata that indicates the highest (or relatively most urgent) priority and is associated with one or more containers 108. The end-of-life associated priority may cause the container orchestration system 24 to schedule any end-of-life associated priority container 108 the fastest among container 108 having other priorities. The verification associated priority corresponds to metadata that indicates the medium highest (or middle urgency) priority and is associated with one or more containers. The verification associated priority may cause the container orchestration system 24 to schedule the associated container 108 after the end-of-life associated priority container 108. The preventive maintenance associated priority corresponds to metadata that indicates the lowest priority of the three example priorities and is associated with one or more containers 108. The preventive maintenance associated priority may cause the container orchestration system 24 to schedule the associated container 108 after the end-of-life associated priority container 108 and the verification associated priority container 108.

One example of a relatively urgent, end-of-life associated priority container 108 could cause monitoring for a current value at which to disconnect a switch to isolate a device in the event of a power supply fault. The verification associated priority may correspond to a priority level whereby the operation is to be used to confirm a machine state or operation but that machine state or operation being labelled incorrectly does not lead to an end-of-life or critical condition of the device. A less urgent, verification associated priority container 108 could correspond to an operation to acquire pressure sensor data when a sensed pressured is determined to be between two threshold values. The threshold values may be used to determine whether delay of the sensor reading is expected to lead to an end-of-life or critical condition of the device. Here, since the sensed pressure is less than an upper threshold, the associated priority does not correspond to an end-of-life event. Indeed, a preventative maintenance associated priority operation may be assigned when the sensed pressure is less than a lower threshold and thus is at no risk of overpressure or fault. In this way, for a same container 108 operation, the priority assigned during operations of FIG. 8 may be based on a current sensor reading, a current machine state, and/or the operation itself, in addition to any other reasonable parameter that may aid in assigning a priority to the container 108 being deployed.

The container orchestration system 24 may, at block 196, determine data acquisition parameters for each of the multiple desired containers 108. The data acquisition parameters may correspond to a frequency of data collection, a frequency of execution of the container 108 to repeat data acquisition, a path to use to transmit acquired data, an indication of a number of operational dependencies based on the data acquired, or the like. The data acquisition parameters may be user-defined metadata, metadata shipped with the container 108, metadata updated based on historical system performances, or the like. Indeed, the data acquisition parameters may be indicated in a lookup table defining various characteristics of respective containers able to be deployed from the container registry 26. In some cases, the indication itself may include an indication of the machine life cycle parameters. For example, a highest priority may be given to the data acquisition operation that has the relatively highest number of operational dependencies based on the data acquired and that has a relatively lowest (e.g., single) frequency of data collection and/or a relatively quickest sampling period (e.g., lowest amount of time spent gathering the data). In some cases, the priorities are determined through thresholds, such as whether a given parameter crosses (e.g., exceeds, less than) a value set as a threshold value.

Based on the multiple priorities and the data acquisition parameters, the container orchestration system 24 may, at block 198, determine a relative priority corresponding to the multiple desired containers 108 based on the data acquisition parameters and the machine life cycle parameters. The container orchestration system 24 may determine a relative priority based on the priority determined at block 194 corresponding to the machine life cycle parameter and based on the priority determined at block 198 corresponding to the data acquisition parameter. For example, a container 108 corresponding to a relatively highest priority data acquisition parameter and an end-of life parameter may be deployed or scheduled to be deployed first.

At block 200, the container orchestration system 24 may deploy the multiple desired containers 108 based on the relative priority set in block 198. To do so, the container orchestration system 24 may use the relative priority when scheduling the multiple desired containers 108 in FIG. 5 to be deployed at block 132.

Elaborating further on how various conflicts in scheduling may be resolved, in general, the container orchestration system 24 may generally schedule more urgent container 108 first and resolve ties in urgency based on data acquisition parameters. For example, when multiple end-of-life associated priority container 108 are desired to be deployed, the container 108 with the relatively highest frequency may be scheduled first (e.g., once a second verses once a day). Sometimes, individual operational container 108 may have sub-priorities that are referred to when there are multiple end-of-life associated priority container 108 scheduled to be deployed. As another example, when scheduling an end-of-life associated priority container 108 conflicts with scheduling a verification associated priority container 108, the container orchestration system 24 may resolve the conflict by scheduling the end-of-life associated priority container 108 first and then the verification associated priority container 108 second, regardless of data acquisition parameters. The same applies to a conflict between end-of-life associated priority container 108 and a preventive maintenance associated priority container 108. Should a verification associated priority conflict with a preventive maintenance associated priority container 108, then the container orchestration system 24 may schedule "verification" associated priority container 108 first. Similar to when two or more end-of-life associated priority container 108 conflict, when two or more of any priority types of container 108 conflict, the container orchestration system 24 may resolve the conflict based on the data acquisition parameters.

In some cases, at blocks 198 and 200, the container orchestration system 24 may determine that the one or more devices identified at block 192 are consumed resource-wise with relatively higher priority containers that are unable to stopped or paused to permit deployment of new containers. In these cases, the container orchestration system 24 may deploy (e.g., orchestrate) one or more containers to a nearby edge compute device if the container orchestration system 24 determines doing so is compatible with operational configurations of the containerized application or the container itself. In some cases, a compatible nearby device is unable so the container orchestration system 24 may generate a notification to convey an alert that no solution is able to deployed at this time due to a lack of computing resources.

In some cases, the container orchestration system 24 may preventively operate to mitigate low or constrained computing resource situations. To do so, the container orchestration system 24 may analyze a rule set corresponding to a combination of containers that could be deployed. The container orchestration system 24 may compare the hosting capability of the various compute surfaces and/or devices that a container is eligible to be deployed, where the hosting capability may be an indication of respective processing resources normally available on that compute surface or device. Then, the container orchestration system 24 may evaluate and proactively determine different operational scenarios which may lead to an over-contained orchestration situation, which may result in one or more containers being unable to be deployed to diagnose and/or obtain data when desired. By predicting when computing constraints could prevent container deployment, the container orchestration system 24 may identify hypothetical situations and a likelihood of such a situation occurring. For example, the container orchestration system 24 may identify that "if X, Y, and Z events happen at the same time, then the container orchestration system 24 would lack compute capability to run all of the desired workloads." With this information, an operator may better evaluate response situations identified via the catalog services and the combinations of containers to be deployed and/or whether to install additional devices and/or computational capabilities to expand available resources.

Keeping the foregoing in mind, an example industrial automation system 10 may have hundreds of conveyor belts, such as an enterprise associated with shipping and processing of packages. From a system-management perspective, that enterprise may desire to make operational decisions from a cost-calculation perspective. Thus, the industrial automation system 10 may operate to reduce power consumed in general and balance this with conveyor productivity. In this system, the container orchestration system 24 may deploy agents to evaluate what components of the conveyors have capability to report energy or calculate energy then deploy one or more containers 108 to those devices to collect this energy consumption data. The energy consumption data from the different devices contribute to provide a whole-conveyor or whole-system look at conveyor energy consumption. This allows the energy consumption data reported back to the container orchestration system 24 to be associated to a location of that device in the device hierarchy. Cross-referencing the device hierarchy and the energy consumption data may model and communicate distributed energy consumption across devices in context with a hierarchical production model, which may improve efficiency of operational status communication and reduce a likelihood of error in reporting by automating the hierarchical recording of data processed. In addition, total cost of ownership (TCO) statistics may be acquired by monitoring the operations of various devices and the replacement options that were previously offered, that is currently being offered, or the like by deploying container 108 to monitor costs associated with various device operations. In the same manner, energy costs may be tracked and reported via container 108 and via the hierarchical production model.

In yet another example, container 108 may be deployed to aid in standard compliance, such as IEEE 519 compliance corresponding to desired signal-to-noise ratio. The container orchestration system 24 may deploy a container 108 to identify where relatively high amounts of signal harmonic noise is interjected. The device, such as a motor drive, may be designed to include terminal access to these data measuring points within the device. Common couplings between devices may mask harmonic noise. To obtain an accurate view of the noise conditions, a container 108 to monitor noise may be deployed to a device located deeper in the architecture of the drive or of the system to identify where compliant noise levels may exist. An alert may be generated by the monitoring container 108 when sensed signal-to-noise ratios cross a configurable set point, which may indicate incompliant noise levels.

In some embodiments, the container orchestration system 24 may generate a visualization that may provide a visual indication of an alert, such as the noise level alert described above. The visualization may provide options with regard to locations in which certain containers 108 may be deployed to assist in resolving the issue. Indeed, the container orchestration system 24 may also provide a list of options for the types of container 108 that may be useful in resolving or attempting to resolve the detected issue. The visualization may provide a user the ability to manage the deployment of any of the tasks described above as well. In some cases, the visualization may depict the schedule identified by the container orchestration system 24 in FIG. 5 and instruct an operator to confirm or reorder the scheduled container 108.

The present disclosure is generally directed to industrial automation systems that implement container technologies. A container orchestration system may determine to deploy the one or more containers based on a trigger event, such as receiving scheduling metadata, receiving a command from an industrial automation device, detecting a device being commissioned in the industrial automation system, or the like. In each of these examples, the container orchestration system may determine to deploy a container based on a trigger event and may determine specified start and/or end conditions associated with the container. These determinations may be made based on a schedule, based on an ongoing or expected computing resource use, based on a type of the device that the container is being deployed to, or the like. To deploy the container, the container orchestration system may interrupt one or more ongoing operations, deploy the container, then later resume the one or more previously ongoing operations or start new operations afresh. By operating the deploy containers in lower levels to obtain specifically desired data, more granular data may be acquired and used in higher level industrial automation processing operations. Using more granular data may result in more accurate and efficient corrective operations being made to the industrial automation system. Furthermore, by deploying non-perpetual containers that terminate based on time or data acquisition parameters, computing resources may be deployed more efficiently in the industrial automation system as computing resources may not be tied up in otherwise inactive or unused data acquisition operations. Other benefits are described and/or suggested herein. Accordingly, use of the disclosed techniques may improve product quality, process quality, and efficiency within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a plurality of industrial devices configured to perform one or more operations within an industrial automation system, wherein each device of the plurality of industrial devices comprises a compute surface configured to perform one or more software tasks of one or more containers;
a database configured to store a first plurality of containers as a plurality of container images, wherein each container of the first plurality of containers is associated with a plurality of user-configurable parameters indicating a frequency of data collection, a sampling period, and one or more priorities; and
a processor configured to:
determine a trigger event has occurred based on first sensed data, wherein the trigger event is associated with a first industrial device of the plurality of industrial devices;
identify a second industrial device of the plurality of industrial devices associated with the first industrial device;
determine additional data to be acquired from the second industrial device based on the trigger event;
identify a second plurality of containers from the database based on the additional data and the second industrial device, wherein the second plurality of containers is configured to acquire the additional data when deployed on the second industrial device;
determine relative priorities of the second plurality of containers, wherein determining the relative priorities comprises determining a relative priority for each container of the second plurality of containers based on the plurality of user-configurable parameters;
deploy a container of the second plurality of containers to the second industrial device based on the relative priorities of the second plurality of containers;
receive the additional data from the container deployed on the second industrial device;
identify a remedial action based on the additional data; and
send one or more control signals configured to cause the first industrial device, the second industrial device, or both to implement the remedial action.

2. The system of claim 1, wherein the container is configured to:
acquire sensing data from a sensor of the second industrial device;
perform a processing operation on the sensing data;
generate the additional data based on the processing operation; and
transmit the additional data to the processor without transmitting the sensing data.

3. The system of claim 2, wherein the sensing data comprises a first amount of data, wherein the additional data comprises a second amount of data, and wherein the second amount of data is less than the first amount of data.

4. The system of claim 1, wherein the trigger event corresponds to a device installation associated with the second industrial device.

5. The system of claim 4, wherein the device installation corresponds to an installation of a device communicatively coupled to the second industrial device.

6. The system of claim 1, wherein the processor is configured to deploy the container to the second industrial device at least in part by:
   querying the second industrial device to obtain an indication of one or more active containers on the second industrial device;
   determining one or more times to offload the one or more active containers from the second industrial device; and
   sending a first command to offload the one or more active containers from the second industrial device at the one or more times.

7. The system of claim 6, wherein the processor is configured to:
   receive an indication that a threshold amount of the additional data is received from the container deployed on the second industrial device; and
   send a second command to offload the container from the second industrial device and resume the one or more active containers.

8. The system of claim 1, wherein the processor is configured to determine the second industrial device based on an indication that a first frequency of data collection of the second industrial device is faster than a second frequency of data collection of the second industrial device.

9. The system of claim 1, wherein the processor is configured to receive the first sensed data from an additional container deployed on the first industrial device based on the first industrial device being installed in the industrial automation system.

10. A non-transitory, computer-readable medium storing instructions that, when executed by a processor, cause the processor to perform operations comprising:
   receiving an alert associated with one or more operations of an industrial automation system, wherein the industrial automation system comprises a plurality of industrial devices configured to perform the one or more operations within the industrial automation system, and wherein each device of the plurality of industrial devices comprises a compute surface configured to perform one or more software tasks of one or more containers;
   identifying a first industrial automation device of the plurality of industrial devices as operationally related to the alert;
   determining additional data to be obtained related to the alert;
   identifying a first plurality of containers to be deployed to the first industrial automation device to acquire the additional data from a database, wherein the database is configured to store a second plurality of containers as a plurality of container images, and wherein each container of the second plurality of containers is associated with a plurality of user-configurable parameters indicating a frequency of data collection, a sampling period, and one or more priorities;
   determining relative priorities of the first plurality of containers, wherein determining the relative priorities comprises determining a relative priority for each container in the first plurality of containers based on the plurality of user-configurable parameters;
   deploying one or more containers of the first plurality of containers to the first industrial automation device based on the relative priorities of the first plurality of containers;
   receiving one or more portions of the additional data from the one or more containers of the first plurality of containers;
   diagnosing a condition of the industrial automation system based on at least some of the additional data;
   identifying a remedial action to address the condition of the industrial automation system; and
   sending one or more control signals configured to cause the first industrial automation device to implement the remedial action.

11. The computer-readable medium of claim 10, wherein the instructions cause the processor to perform operations comprising:
   determining an active container to offload from the first industrial automation device based on an offloading rule; and
   sending a command to offload the active container from the first industrial automation device.

12. The computer-readable medium of claim 11, wherein the instructions cause the processor to perform operations comprising determining the offloading rule based on the first industrial automation device, the first plurality of containers, a hierarchical level associated with the first industrial automation device, or any combination thereof.

13. A non-transitory, computer-readable medium storing instructions that, when executed by a processor, cause the processor to perform operations comprising:
   receiving an indication that a trigger event has occurred, wherein the trigger event corresponds to first data acquired at a first frequency in association with a first industrial device of a plurality of industrial devices associated with a first hierarchical level of an industrial automation system, wherein the industrial automation system comprises the plurality of industrial devices configured to perform one or more operations within the industrial automation system, and wherein each industrial device of the plurality of industrial devices comprises a compute surface configured to perform one or more software tasks of one or more containers;
   identifying a second industrial device of the plurality of industrial devices associated with the first industrial device;
   determining additional data to be acquired from the second industrial device based on the trigger event;
   identifying a plurality of containers to be deployed to the first industrial device to acquire the additional data from a database storing a first plurality of containers as a plurality of container images, wherein each container of the first plurality of containers is associated with a plurality of user-configurable parameters indicating a frequency of data collection, a sampling period, and one or more priorities;
   determining relative priorities of the plurality of containers, wherein determining the relative priorities comprises determining a relative priority for each container in the plurality of containers based on the plurality of user-configurable parameters;
   deploying a container of the plurality of containers to the second industrial device based on the relative priorities of the plurality of containers;
   receiving the additional data from the container deployed on the second industrial device;
   identifying a remedial action based on the additional data; and
   sending one or more control signals configured to cause the first industrial device, the second industrial device, or both to implement the remedial action.

14. The computer-readable medium of claim 13, wherein the instructions cause the processor to perform operations comprising:
- receiving an alert as the indication that the trigger event has occurred;
- identifying a subset of the plurality of industrial devices related to the alert, wherein the plurality of industrial devices is associated with a plurality of hierarchical locations of the industrial automation system, and wherein the subset of the plurality of industrial devices comprises the second industrial device;
- identifying a subset of the plurality of hierarchical locations associated with the subset of the plurality of industrial devices; and
- deploying a set of containers from the database to the second industrial device of the subset of the plurality of industrial devices based on the subset of the plurality of hierarchical locations and the alert.

15. The computer-readable medium of claim 14, wherein the instructions cause the processor to perform operations comprising:
- identifying the set of containers based on the second industrial device being configured to perform a data acquisition operation, wherein the set of containers are configured to generate third data based on performing a processing operation on sensing data acquired via the data acquisition operation, wherein the sensing data comprises a first amount of data, and wherein the data comprises a second amount of data less than the first amount of data; and
- receiving the third data from the set of containers without receiving the sensing data.

16. The computer-readable medium of claim 13, wherein the instructions cause the processor to perform operations comprising:
- querying the second industrial device to obtain an indication of one or more active containers on the second industrial device;
- determining one or more times to offload the one or more active containers from the second industrial device; and
- sending a first command to offload the one or more active containers from the second industrial device at the one or more times.

17. The computer-readable medium of claim 16, wherein the instructions cause the processor to perform operations comprising:
- querying the second industrial device to obtain an indication of a plurality of active containers on the second industrial device comprising the indication of the one or more active containers on the second industrial device;
- identifying the one or more active containers for offload based on an offloading rule; and
- sending a second command to offload the one or more active containers from the second industrial device in response to identifying the one or more active containers.

* * * * *